UNITED STATES PATENT OFFICE.

D. E. COUTARET, OF BOSTON, MASS.

IMPROVEMENT IN DISINFECTING FECAL MATTER.

Specification forming part of Letters Patent No. 14,053, dated January 8, 1856.

*To all whom it may concern:*

Be it known that I, DOMINIQUE EMILE COUTARET, now of Boston, in the county of Suffolk and Commonwealth of Massachusetts, have invented a new and Improved Mode of Deodorizing Fecal Matter and all Animal Matter in a State of Putrefaction, and by the same process manufacturing azotized manures; and I do hereby declare that the following is a full and exact description thereof.

The nature or principle of my invention consists in the coagulation of the albumen contained in fecal matter and all animal matter, preventing the return of all putrid fermentation and the disengagement of any deleterious emanations or disagreeable odors by means of chemical reagents, which effect this coagulation immediately and transform these substances into azotized manures.

To enable others to use my invention, I will describe its preparation and operation.

I prepare my deodorizing-liquid by boiling chimney-soot in water, in order to extract from it the empyreumatic principle with which it abounds, and, above all, the creosote, which has the property of coagulating the albumen. After boiling one hour I dissolve in this decoction of soot a salt of iron, destined to neutralize the sulphureted hydrogen and the hydrosulphate of ammonia, which are disengaged by substances in putrefaction. I employ the acetate of iron in preference to all other salts of iron. After having decanted the liquid I drain and dry the deposit, consisting of the charcoal of the soot impregnated with acetate of iron, and containing sufficient creosote to form a powerful deodorizing-powder. I obtain by this means two powerful products or reagents: first, a deodorizing liquid creosote; second, a deodorizing absorbent powder. To effect the deodorization I add to the fecal matter a quantity of the liquid creosote proportioned to the disagreeable odor, and ordinarily about five per cent. If the matter is liquid, I add the absorbent powder. I effect the deodorization of putrid flesh and dead bodies, whether of animals or otherwise, by either sprinkling over them the liquid creosote or immersing them in the said liquid and covering them with the absorbent powder. In operating thus the albumen of the animal or fecal matter becomes coagulated and ulterior putrid fermentation becomes impossible. To obtain a more prompt effect I often add to my liquid a small quantity of alcohol saturated with creosote. All the matter thus deodorized becomes quickly dry, and, being pulverized, forms azotized manure, which contains all the azote which the animal and fecal matter ordinarily loses in the form of ammoniacal gas, and preserves all other qualities valuable to agriculture.

What I claim as my invention, and desire to secure by Letters Patent, is—

The use of the ingredients named for deodorizing feculent or other decomposing organic matter and converting said matter into a manure, as described.

D. E. COUTARET.

Witnesses:
W. H. L. SMITH,
EDMUND B. OTIS.